Feb. 23, 1965 W. WANIELISTA 3,170,381

ADJUSTABLE DRUM FOR A ROTARY EXPOSURE UNIT

Filed March 28, 1963 2 Sheets-Sheet 1

INVENTOR.

Walter Wanielista

BY

Hill, Sherman, Meroni, Gross & Simpson

ATTORNEYS

Feb. 23, 1965 W. WANIELISTA 3,170,381

ADJUSTABLE DRUM FOR A ROTARY EXPOSURE UNIT

Filed March 28, 1963 2 Sheets-Sheet 2

INVENTOR.
Walter Wanielista
BY
Hill, Sherman, Meroni, Gross & Simpson
ATTORNEYS

United States Patent Office 3,170,381
Patented Feb. 23, 1965

1 2

3,170,381
ADJUSTABLE DRUM FOR A ROTARY EXPOSURE UNIT

Walter Wanielista, Westchester, Ill., assignor to Robertson Photo-Mechanix, Inc., Chicago, Ill., a corporation of Illinois Filed Mar. 28, 1963, Ser. No. 268,709
9 Claims. (Cl. 95—76)

This invention relates generally to improvemnts in the graphic arts and more particularly relates to exposure equipment used in making masters or plates to be used in printing and characterized by end plates having retaining means for supporting and retaining drum surface means of selectively different adjusted sizes. The principles of this invention may be extended to any other apparatus wherein the use of an adjustable drum is desired.

The embodiment of the invention shown in the accompanying drawings discloses an illustrative rotary type exposure unit for imprinting images derived from a negative upon a sheet of photosensitive material such as a photopolymer printing plate. The exposure unit comprises a rotating drum, a vacuum system and an ultra-violet exposure light. In operation, a photopolymer printing plate is wrapped around the outside surface of the drum. A negative having the image to be reproduced imprinted thereon is wrapped around the printing plate and then a sheet or cover of transparent material such as clear plastic is wrapped around the negative and the printing plate. The loose ends and edges of the plastic sheet are secured to the drum in air-tight relation, as for example, by the use of adhesive tape.

After the edges of the plastic sheet have been securely taped to the drum, the vacuum system, which comprises a heavy-duty vacuum pump and motor, is energized to withdraw air from the drum. Small apertures are formed in the face of the drum so that air contained within the sealed plastic sheet or cover is also withdrawn, thereby causing the plastic sheet as well as the negative and the photopolymer printing plate, to be drawn tightly around the outer surface of the drum to effect an accurate, wrinkle-free reproduction of the image on the photopolymer printing plate.

Next, the light source, which is located in spaced relation to the drum, is energized to produce an exposure light for effecting polymerization of the printing plate, and the drum is rotated so as to expose the entire surface of the negative and the printing plate to the light source. Polymerization of various portions of the printing plate is effected as the plate is exposed to the light source in proportion to the amount of light which passes through the negative at various portions thereof. After exposure, the printing plate is developed by washing or leaching-out the background, thereby providing a relief image suitable for printing usage.

In the graphic arts industry, different sized printing plates are utilized depending on the size of the printing press and the size of the copy being printed.

As various sizes of negatives are employed in the exposure unit it is necessary and desirable that the size of the rotating drum assembly be varied. For example, if a negative to be used is ten inches in length, it would be desirable for the rotating drum to have a circumference of approximately twelve inches. If a negative to be used is eighteen inches in length, it would be desirable for the drum to have a circumference of approximately twenty inches.

Heretofore, it was necessary to have a plurality of sizes of rotating drums to properly accommodate negatives of various lengths. If the image from a small negative were to be reproduced, a rotating drum having a reduced diameter would be used. Subsequently, if the image of a larger negative were to be reproduced, the reduced diameter drum would be completely removed from the exposure unit and a larger diameter drum would be installed in its place. This method of varying the diameter of the rotating drum is not only time consuming but requires that a plurality of drums of varying diameters be kept on hand for use in accordance with the various lengths of negatives to be reproduced.

In accordance with the present invention an adjustable rotary vacuum exposure unit which can accommodate negatives of varying lengths without the necessity of using a plurality of rotating drums of various diameters is provided. For example, a rotary exposure unit is provided having a pair of rotatable end plates with a plurality of grooves of varying diameters formed therein for receiving a drum plate, thereby providing a rotating drum, the diameter of which varies as the selected drum plate is inserted into a corresponding groove of desired diameter.

It is an object of the present invention to provide a rotary vacuum exposure unit having a pair of rotatable end plates mounted thereon for rotating a cylindrical drum, the diameter and axial length of which can be varied without removing and changing the end plates.

Yet another object of the present invention is to provide a rotary vacuum exposure unit having an adjustable diameter, and vacuum means for maintaining a negative and a printing plate tightly around the drum.

Another object of the present invention is to provide a rotary exposure unit having a pair of rotatable end plates mounted thereon with a plurality of radially spaced grooves formed therein for receiving a drum plate to form a drum cylinder of varying diameter depending on the particular grooves into which the plate is inserted, the grooves being so arranged in the end plates so as to provide easy ingress and egress of the drum plate thereinto and therefrom.

Many other features, advantages and additional objects will become manifest to those versed in the art from the detailed description of the invention which follows and the accompanying sheets of drawings in which a preferred embodiment of a rotary vacuum exposure unit incorporating the principles of the present inveniton is shown by way of illustrative example.

Although the principles of the present invention are of utility in any application involving the use of a drum of variable diameter, a particularly useful application is made to exposure equipment for the graphic arts industry and an illustrative embodiment herein shown consists of a rotary vacuum exposure unit commonly used in the polymerization process of aerial image reproduction for preparing printing plates.

Figure 1:
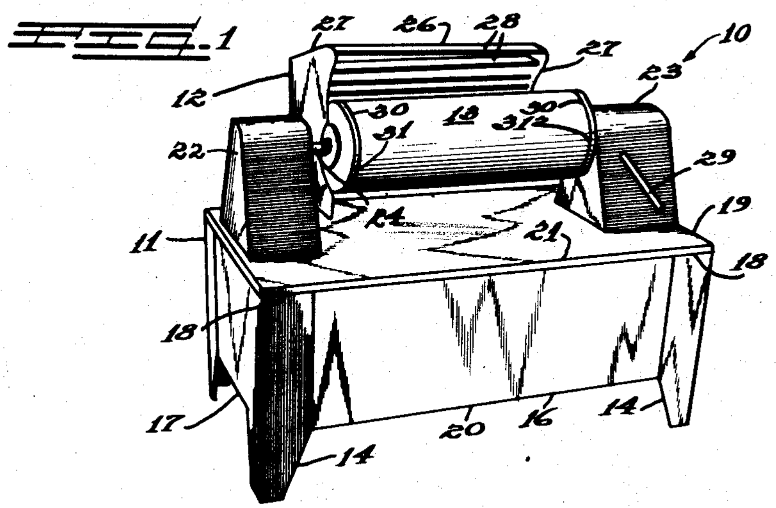
FIGURE 1 is a perspective view of a rotary vacuum exposure unit embodying the present invention.

A rotary vacuum exposure unit embodying the principles of the present invention is shown generally at 10 in FIGURE 1 wherein is illustrated a cabinet enclosure as at 11, an exposure light assembly as at 12 and a rotatable cylinder drum as at 13.

The cabinet enclosure 11 more specifically includes a plurality of vertically extending angularly shaped corner braces or legs as at 14, front and rear panels as at 16 and end panels as at 17.

Extending horizontally over the top edges 18 of the legs 14 is a top panel as at 19 which serves as a cover for certain mechanical and electrical equipment mounted within a lower portion 20 of the cabinet enclosure 11 and also serves as a work surface during operation of the exposure unit.

Mounted on the top surface 21 of the top panel 19 are left hand and right hand spindle assemblies indicated respectively by reference numerals 22 and 23. Each of the spindle assemblies 22 and 23 comprises journal means for receiving a horizontally disposed spindle shaft as at 24 and 25. The spindle shafts 24 and 25 are in axial alignment and the spindle shaft 24 is connected to a motor means for effecting motor driven rotation thereof.

In order to provide a vacuum source, a heavy-duty electrically energized vacuum pump is mounted within the lower portion 20 of the cabinet enclosure 11 and conduit means interconnect the interior of the drum 13 and the vacuum pump for evacuating air from the drum 13 are incorporated within the spindle assembly 22.

The exposure light assembly 12 more particularly comprises a lamp cabinet as at 26 having a pair of end walls 27, 27 extending vertically upwardly from and connected in fixed assembly to the top surface 21 of the top panel 19. A light source adapted to emit ultra-violet rays therefrom is mounted within the lamp cabinet 26 and in order to direct these rays substantially at right angles to the drum 13, a plurality of light collimators as at 28 are mounted between the members 27, 27 and interposed between the lamp and the drum 13.

In order to manually selectively activate the vacuum system and energize the motor drive for the spindle shaft 24 and the lamp, an actuating switch comprising a lever or handle as at 29 is pivotally mounted on the right hand spindle assembly 23, and when moved to various operating positions, will effectively energize various electrical circuits to operate the motor driven pump for the vacuum system, the motor for the spindle shaft 24 and the light source.

As best illustrated in FIGURE 1, a pair of end plates 30, 30 are mounted for corotation respectively on each of the spindle shafts 24 and 25. The end plates 30, 30 have interfacing side faces as at 31, 31 which extend radially outwardly of the axis of rotation of the spindle shaft 24.

Figure 2:
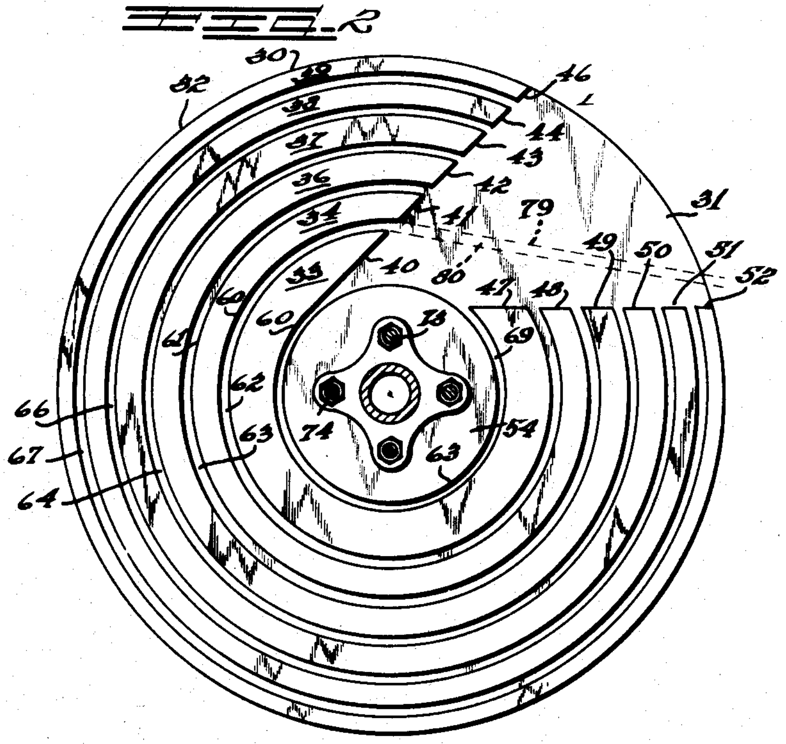
FIGURE 2 is a side view of an end plate of the present invention showing the inner side face thereof and illustrating a drum plate inserted into various grooves thereof.

Referring to FIGURE 2, an end plate 30 is illustrated as having a circularly shaped, circumferentially continuous peripheral or outer wall as at 32 and a series of ribs formed by radially spaced projecting portions or lands 33, 34, 36, 37, 38 and 39. Each of the lands or ribs extends in a counterclockwise direction from a corresponding entrance wall 40, 41, 42, 43, 44 and 46, respectively, to a corresponding exit wall indicated at reference numerals 47, 48, 49, 50, 51 and 52. The entrance walls are disposed in a plane which constitutes a first partial or fragmental chord of the circular end plate 30, and the exit walls lie in a plane which constitutes a second partial chord of the end plate 30 and intersects the first chord at a point eccentric to the center of the end plate 30.

Figures 3, 4, 5:
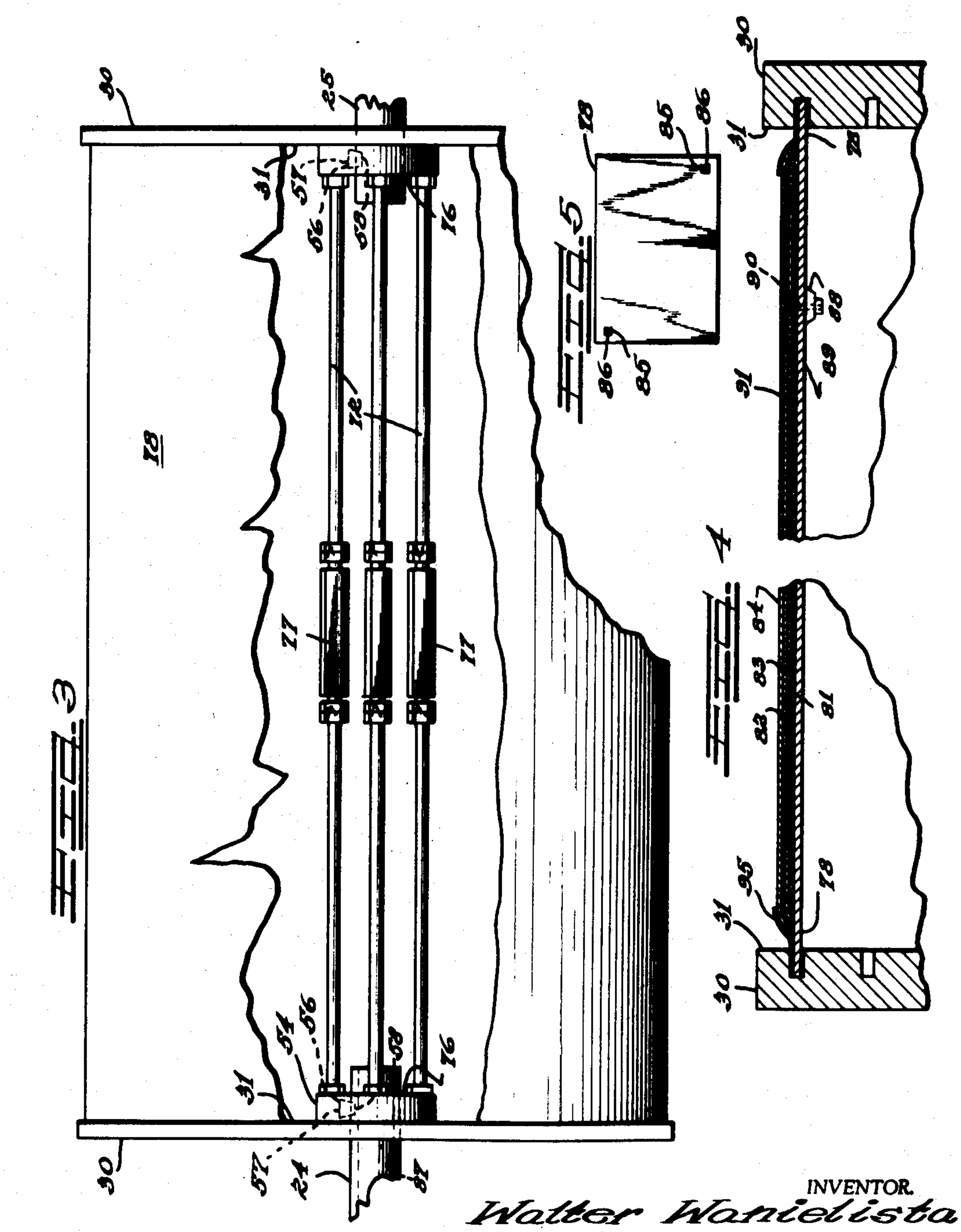
FIGURE 3 is a front view of a drum assembly of the present invention with portions cut away.
FIGURE 4 is a fragmentary cross-sectional view of the drum assembly of the present invention with sheet form members mounted thereon as exemplifying a typical usage.
FIGURE 5 is a reduced view of a peripheral wall means provided in accordance with the present invention.

As illustrated in FIGURES 2 and 3, a center portion of the end plates 30, 30 comprises a cylindrically shaped centrally apertured boss or hub 54. Each hub 54 projects axially inwardly from the adjoining side face 31 and is adapted to receive one of the spindle shafts 24 or 25 for mounting thereon. It is desirable to provide for slidable mounting of the hubs 54 on the spindle shafts 24 and 25 and for this purpose grooves or keyways 56 are formed respectively in the hubs 54 for receiving a key as at 57 which is inserted into a complementarily shaped slot as at 58 formed in each of the spindle shafts 24 and 25. The end plates 30, 30 can therefore be slidably mounted on the spindle shafts 24, and 25 but will rotate in fixed assembly with the shafts 24 and 25.

As shown in FIGURE 2, each of the lands 33, 34, 36, 37, 38 and 39 defines a radially inwardly located side wall as at 60 and a radially outwardly located side wall as at 61. A plurality of radially spaced grooves as at 62, 63, 64, 66 and 67 are defined by interfacing side walls of adjacent lands, as for example, side walls 60 and 61, and the depth of the grooves is such as to be coplanar with a depressed portion 53 of the side face 31 formed between the first and second chords in which lie the entrance walls 40, 41, 42, 43, 44 and 46 and the exit walls 47, 48, 49, 50, 51 and 52.

The outer wall 63 of the hub 54 comprises an interfacing wall of the radially inwardly located side wall 60 of the land 33, thereby forming therebetween an additional groove as at 69.

Referring to FIGURE 4, the lands and grooves of each of the end plates 30, 30 are shown radially arranged on the respective side faces 31, 31 so that the lands and grooves of one side face are in concentric registry with the lands and grooves of such other side face.

In order to prevent misalignment of the end plates 30, 30 in respect of their respective lands and grooves, the keyways 56 and 58 of the hubs 54 and the spindle shafts 24 and 25, respectively, can be arranged so that when the keys 57 are inserted therein the lands and grooves of the two end plates 30, 30 will be in projected registry.

It is contemplated by the present invention that only one of the spindle shafts 24 and 25 need be motor driven. In order to provide for corotation of the end plates 30, 30 and in order to provide for adjustable axial spacing of the end plates 30, 30 a plurality of tie rods as at 72 are arranged to interconnect the hubs 54, 54. The tie rods 72 may be connected to the hubs 54, 54 in any suitable manner, for example, by means of suitably threaded end portions of the tie rods 72 engageable with complementarily threaded bolt holes 73 (FIGURE 2) formed in the hub members 54, 54. A lock bolt, as at 74, can be mounted in threaded engagement on the tie rods 72 and drawn up tightly to end faces 76 of the hubs 54, 54 to secure the tie rods 72 is fixed assembly to the hubs 54, 54. In order to maintain the side faces 31, 31 in parallel relation, the tie rods 72 are provided with toggles as at 77 which can be rotated to lengthen or shorten the tie rods 72, thereby locking the end plates 30, 30 on the spindle shafts 24 and 25 in adjusted assembly.

In order to provide a cylinder drum of varying diameter in accordance with the present invention, a flexible drum plate 78 is inserted selectively into any pair of the grooves 62, 63, 64, 66, 67 and 69 of the end plates 30, 30. The drum plate 78 may comprise a sheet of stainless steel or other material which is sufficiently flexible to conform to the configuration of the grooves while maintaining sufficient rigidity to prevent bending or sagging in its longitudinal direction when installed between the end plates 30, 30.

A typical drum plate 78 is shown in developed form in FIGURE 5 wherein the plate 78 is characterized as a generally rectangular sheet-form member having parallel ends and sides. A pair of bosses 85 are mounted at opposite corners and are apertured as at 86 to form air flow passages controlled by a check valve 88. The plate may be pre-bent to a curavature corresponding to a particular size of printing plate for a printing press. Thus, a plurality of plates 78 may be used in the sizes corresponding to the needs of the user.

The plate 78 is inserted radially inwardly into the depressed portions 53 of the side faces 31, 31 and the leading edge thereof is inserted into a pair of selected grooves. In order to facilitate insertion of the drum plate 78 into any pair of radially spaced grooves, inlet and exit means for the grooves are provided. The respective planes in which lie the entrance walls 40, 41, 42, 43, 44 and 46 and the exit walls 47, 48, 49, 50, 51 and 52 are arranged so that a tangent drawn from any of the grooves 62, 63, 64, 66, 67 and 69 at the adjacent entrance walls thereof will intersect the plane in which lie the exit walls 47, 48, 49, 50, 51 and 52 at a point radially outwardly of the outermost part of the exit wall 52. The arrangement thus described permits insertion of the drum plate 78 into any of the pairs of grooves without interference with any of the exit walls.

In order to illustrate the relation between the drum plate 78 and the exit walls 47, 48, 49, 50, 51 and 52 as the drum plate 78 is being inserted into a pair of grooves in side faces 31, 31, a pair of dashed lines 79 and 80 are illustrated in FIGURE 2 as drawn from a tangent of the groove 62 at the adjacent entrance walls 40 and 41. It will be noted the dashed lines 79 and 80 intersect the plane in which lie the exit walls 47, 48, 49, 50, 51 and 52 at a point radially outwardly of the radially outwardmost part of the exit wall 52. The drum plate 78 may thus be inserted into the groove 62 without deflecting the plate and without intereference with the exit wall 52. Similarly, a drum plate 78 of any selective size could be inserted into any of the other corresponding sets of grooves, since tangents drawn from any other pair of grooves at their adjacent entrance walls intersect the plane in which lie the exit walls at a point radially outwardly of the exit wall 52.

Referring now to FIGURE 4, a drum plate 78 is illustrated as being inserted into corresponding grooves 67, 67 of the end plates 30, 30. To condition the surface of a portion of the drum plate 78 intermediate the side faces 31, 31, a thin wire mesh 81 is wrapped around the drum. A photopolymer printing plate 82 is then wrapped on the outer surface of the wire mesh 81 and a negative 83 to be reproduced on the printing plate 82 is then wrapped circumjacent the plate 82. Completely enveloping the printing plate 82 and the negative 83 is a transparent cover 84 constituting material such as clear plastic or the like. The plastic cover 84 extends beyond the outer edges of the printing plate 82 and the negative 83 where it is secured to the drum plate 78 in air-tight relation by any suitable means, such as adhesive tape as at 95. Further, the plastic cover 84 is wrapped so as to extend around the circumference of printing plate 78 for more than 360° thereof, and the leading edge is also sealed by means of adhesive tape so as to prevent leakage of air therethrough.

In order to produce a pressure less than atmospheric within the cylinder drum 13, the vacuum system of the exposure unit 10 is connected by means of conduit to the spindle shaft 24 by any suitable means, as for example, reinforced rubber hosing. A cylindrically shaped axially extending passageway 87 is formed in the spindle shaft 24 and is in open communication with the interior of the drum 13.

A plurality of flow check valves 88 are fixedly mounted on the inner surface 89 of the drum plate 78. Each of the check valves 88 is in register with a small passageway or aperture 90 which extends through the drum plate 78 and is in open communicattion with the interior and the exterior of the drum 13. Actuattion of the vacuum system will reduce the air pressure within the drum 13 as well as the air confined between the outer surface 91 of the plate 78 and the plastic cover 84. Atmospheric pressure surrounding the plastic cover 84 will tend to urge the plastic cover 84, the negative 83 and the printing plate 82 into firm engagement with the drum 13.

The actuating switch or handle 29 is selectively moved to a position energizing the driving motor of spindle shaft 24 and also the ultra-violet lamp. As the drum 13 is rotated, the negative 83 and the printing plate 82 are exposed to the light source and photopolymerization of the printing plate 82 is effected in accordance with the image carried by the negative 83. After the printing plate 82 and the negative 83 have been thus exposed to the light, the actuating handle 29 can be moved to deenergize the spindle shaft motor, the vacuum system and the lamp. The plastic cover 84, the negative 83 and the printing plate 82 can then be removed from the drum 13. The printing plate 82 is thereupon in condition to be washed or leached-out in the usual manner.

Accordingly, there has been provided a rotary vacuum exposure unit of simple construction having means for selectively varying the diameter of the rotating drum without the necessity of maintaining an inventory of drums of various diameters.

Although various modifications might be suggested by those versed in the art, I wish to embody within the scope of the patent warranted hereon all such modifications as come within the scope of my contribution to the art.

I claim as my invention:

1. In drum-type photographic exposure apparatus,
   a pair of end plates mounted for rotation,
      each of said end plates having a side face facing toward and parallel to the side face of the other of said end plates,
   means defining a plurality of radially spaced annularly shaped ribs and grooves on said side faces,
      said ribs and grooves being arranged in registry with corresponding ribs and grooves of the other side face,
   drum plate means comprising a plate extending between said end plates and slidably inserted into a pair of grooves to form a cylinder of selected size,
   inlet means formed in said side faces to lead said plate means into any pair of said corresponding grooves, and
   means to effect rotation of said end plates.

2. In drum-type photographic exposure apparatus for exposing sheets of photographic material to a light source of the type including a pair of spaced axially aligned rotatable spindle shafts, the improvement comprising,
   a pair of substantially circularly shaped end plates adjusted to be rotatably mounted on the shafts,
      each of said end plates having a side face facing toward and parallel to the side face of the other of said end plates,
   means defining a plurality of radially spaced annularly shaped lands and grooves on said side faces,
      the lands and grooves of each of said side faces having a pair of terminus ends disposed on chordal lines intersecting each other at an angle,
      said lands and grooves being arranged so that the lands and grooves of one side face are in concentric registry with the lands and grooves of the other side face, and
   drum plate means comprising a sheet of flexible plate extending between said end plates and adapted to be slidably inserted into a pair of said grooves to provide a substantially cylindrically shaped surface.

3. In drum-type photographic exposure apparatus for subjecting sheets of photographic material to a light treatment,
   a pair of spaced axially aligned rotatable spindle shafts,
   a pair of circularly shaped end plates having interfacing side faces,
   apertures formed in said end plates centrally thereof for receiving respectively one of said spindle shafts for mounting thereon,
   means defining a plurality of radially spaced annularly shaped lands projecting outwardly from each of said side faces,
      said lands defining a plurality of annularly shaped grooves therebetween,
      said lands and grooves being arranged in concentric registry with the lands and grooves on the other of said side faces,
      each of the lands on each of said side faces having a pair of spaced ends disposed along with the ends of adjacent lands on a pair of chordal lines which intersect each other at an angle, drum-plate means comprising a sheet of flexible plate extending between said end plates and adapted to be inserted slidably into a pair of grooves mutually in registry to provide a substantially cylindrically shaped surface for receiving photographic material thereon, and means to effect corotation of said end plates.

4. In drum-type photographic exposure apparatus for subjecting photosensitive material to a light treatment,
a light source,
a pair of axially aligned substantially horizontally disposed spindle shafts positioned in spaced relation to said light source,
a pair of substantially circularly shaped end plates mounted respectively on said spindle shafts for corotation therewith,
each of said end plates having a side face extending perpendicularly to the axes of said shafts,
a plurality of annularly shaped radially spaced lands formed on said side faces and defining grooves therebetween,
each of said lands having an entrance wall and an exit wall disposed in spaced relation to each other,
said entrance walls and said exit walls lying in respective planes intersecting each other in eccentrically offset relation to said axes,
said lands being disposed such that a tangent drawn from the radially outwardly disposed wall of the innermost land at the entrance wall thereof intersects the plane of the exit walls radially outwardly of the exit wall of the outermost land,
said lands and grooves being arranged in concentric registry with the lands and grooves of the other of said end plates, and
drum plate means comprising a sheet of flexible plate extending between said end plates end adapted to be slidably inserted into a pair of equally radially outwardly spaced grooves through said entrance walls adjacent thereto.

5. In drum-type photographic exposure apparatus for subjecting photosensitive material to a light treatment,
a light source,
a vacuum system and a pair of axially aligned spindle shafts positioned in spaced relation to said light source,
a pair of circularly shaped end plates mounted respectively on said spindle shafts for corotation therewith,
each of said end plates having a side face extending perpendicularly to the axes of said shafts,
each of said side faces having a plurality of annularly shaped radially spaced lands formed respectively thereon and extending angularly around said side faces from a first plane defining a first partial chord of said side face to a second plane defining a second partial chord of said side face,
said lands on each of said side faces forming grooves therebetween such that a tangent drawn from any of said grooves from said first plane in the direction of said second plane will intersect said second plane radially outwardly of said side face,
a drum plate comprising a sheet of flexible material extending between the side faces of said end plates and adapted to be slidably inserted into a pair of equally radially outwardly spaced grooves for forming a drum cylinder,
check valve means mounted on said drum plate to provide air flow from the exterior of the drum cylinder into the interior of the drum cylinder when the drum plate is inserted into said pair of grooves to form a cylinder drum,
a flow passage means formed in one of said spindle shafts axially therethrough and in open communication with the interior of the drum cylinder, and
means connecting said one of said spindle shafts in fluid communication with the vacuum system for withdrawing air from the drum cylinder.

6. In drum-type photographic exposure apparatus for subjecting photosensitive material to a light treatment,
a light source,
a vacuum system,
a pair of axially aligned spindle shafts positioned in spaced relation to said light source,
a pair of circularly shaped end plates mounted respectively on said spindle shafts for corotation therewith,
each of said end plates having a side face extending perpendicularly to the axes of said shafts,
each of said side faces having a plurality of annularly shaped radially spaced lands formed respectively thereon and extending angularly around said side faces from a first plane defining a first partial chord of said side face to a second plane defining a second partial chord of said side face,
said lands on each of said side faces forming grooves therebetween such that a tangent drawn from any of said grooves from said first plane in the direction of said second plane will intersect said second plane radially outwardly of said side face,
a drum plate comprising a sheet of flexible material extending between the side faces of said end plates and adapted to be slidably inserted into a pair of equally radially outwardly spaced grooves for forming a drum cylinder,
check valve means mounted on said drum plate to provide air flow from the exterior of the drum cylinder into the interior of the drum cylinder when the drum plate is inserted into said pair of grooves to form a drum cylinder,
flow passage means formed in one of said spindle shafts axially therethrough and in open communication with the interior of the drum cylinder,
means connecting said one of said spindle shafts in fluid communication with the vacuum system for withdrawing air from the drum cylinder, and
means comprising a layer of wire mesh wrapped around said drum cylinder for receiving photographic material thereon.

7. In drum-type photographic exposure apparatus for subjecting photosensitive material to a light treatment,
a light source,
a pair of axially aligned spindle shafts positioned in spaced relation to said light source,
a pair of circularly shaped end plates mounted respectively on said spindle shafts for corotation therewith,
each of said end plates having a side face extending perpendicularly to the axes of said shafts,
each of said side faces having a plurality of annularly shaped radially spaced lands formed respectively thereon and extending angularly around said side faces from a first plane defining a first partial chord of said side face to a second plane defining a second partial chord of said side face,
said lands on each of said side faces forming grooves therebetween such that a tangent drawn from any of said grooves from said first plane in the direction of said second plane will intersect said second plane radially outwardly of said side face,
each of said side faces forming respectively a recessed portion intermediate said first and second planes,
a plurality of axially adjustably extensible tie rods interconnecting said end plates for effecting corotation of said end plates and for maintaining a parallel relation between said end plates, and
a drum plate comprising a sheet of flexible material extending between the side faces of said end plates and adapted to be slidably inserted into a pair of equally radially outwardly spaced grooves for forming a drum cylinder.

8. In drum-type photographic exposure apparatus including a rotatable spindle, a pair of end plates mounted on said shaft in axially spaced relation and having axially confronting faces, means operative to maintain said end plates in fixed positions, respectively, on said spindle, means forming radially spaced concentric grooves in each of said faces in register with corresponding grooves in the other of said faces, a peripheral wall means insertable selectively into any of said corresponding pairs of said grooves to form a drum having a selectively variable diameter, and inlet means also formed in said side faces to lead said wall means into any pair of said corresponding grooves while said end plates are maintained in said fixed positions.

9. In drum-type photographic exposure apparatus for exposing sheets of photographic material to a light source of the type including a pair of spaced axially aligned rotatable spindle shafts, the improvement comprising, a pair of end plates having confronting faces and adapted to be mounted on said spindles, means retaining said plates in given positions, respectively, on said spindles, concentric radially spaced grooves formed in said confronting faces and opening thereto with each of said grooves in each of said faces having a corresponding groove in the other of said faces in registry therewith, said grooves extending axially into their respective faces a distance to provide an equal axial distance between each of the pairs of corresponding grooves while said plates are maintained in their given positions, peripheral wall means insertable into selected pairs of corresponding grooves to adjustably and selectively vary the diameter of the drum, and inlet means formed in said grooved faces to lead said wall means into any of said pairs of corresponding grooves without obstruction while said plates are maintained in their said given positions on said spindles.

References Cited by the Examiner

UNITED STATES PATENTS

| | | | |
|---|---|---|---|
| 327,120 | 9/85 | Thompson | 74—230.16 |
| 2,560,696 | 7/51 | Huebner | 95—76 |

EVON C. BLUNK, *Primary Examiner.*